(12) United States Patent
Tseng (10) Patent No.: US 8,227,129 B2
(45) Date of Patent: Jul. 24, 2012

(54) PASSIVE MICRO FUEL CELL

(75) Inventor: Fan-Gang Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 1172 days.

(21) Appl. No.: 11/355,056

(22) Filed: Feb. 15, 2006

(65) Prior Publication Data

US 2006/0183015 A1    Aug. 17, 2006

(30) Foreign Application Priority Data

Feb. 16, 2005  (TW) ................................ 94104435 A (51) Int. Cl.
*H01M 8/02*  (2006.01)
*H01M 8/04*  (2006.01)
*H01M 8/24*  (2006.01)
*H01M 4/96*  (2006.01)

(52) U.S. Cl. ........ 429/455; 429/209; 429/408; 429/456; 429/462

(58) Field of Classification Search .................. 429/455, 429/456, 462
See application file for complete search history.

(56) References Cited

U.S. PATENT DOCUMENTS

| | | | | |
|---|---|---|---|---|
| 4,640,876 A | * | 2/1987 | Warzawski et al. | 429/37 |
| 4,826,741 A | * | 5/1989 | Aldhart et al. | 429/19 |
| 5,167,825 A | * | 12/1992 | Lipski et al. | 210/640 |
| 6,426,160 B1 | * | 7/2002 | Hagino et al. | 429/34 |
| 6,696,195 B2 | * | 2/2004 | Pavio et al. | 429/408 |
| 2003/0003341 A1 | * | 1/2003 | Kinkelaar et al. | 429/34 |
| 2004/0209136 A1 | * | 10/2004 | Ren et al. | 429/30 |
| 2005/0089743 A1 | * | 4/2005 | Lee | 429/34 |
| 2007/0042234 A1 | * | 2/2007 | Okuyama et al. | 429/12 |

FOREIGN PATENT DOCUMENTS

WO    WO 2004/102717    * 11/2004

OTHER PUBLICATIONS

Guo et al. "A passive fuel delivery system for portable direct methanol fuel cells", Journal of Power Sources 132 (2004) 86-91.*
Li et al., "Preparation and Characterization of Multiwalled Carbon Nanotube-Supported Platinum for Cathode Catalysts of Direct Methanol Fuel Cells", J. Phys. Chem. B 2003, 107, 6292-6299.*
Riehl et al., "Effects of Condensation in Microchannels with a Porous Boundary: Analytical Investigation on Heat Transfer and Meniscus Shape", J. of the Braz. Soc. Mechanical Sciences, 2002, vol. XXIV, pp. 186-193.*

* cited by examiner

*Primary Examiner* — Patrick Ryan
*Assistant Examiner* — Ladan Mohaddes
(74) *Attorney, Agent, or Firm* — Egbert Law Offices PLLC (57) ABSTRACT

An efficient and passive micro fuel cell includes an anode plate, a reaction plate, a cathode plate and a condensation plate. The anode plate draws a dilute solution of methanol from a fuel tank to delivery to a series of upper oxidation reaction room through micro-channels by thermal capillarity. The condensation plate separates carbon dioxide and vapor from each other. Meanwhile, the methanol solution is delivered to a plurality of lower oxidation reaction rooms. Protons pass through the inner walls of the reaction holes and a porous membrane layer and arrive in the lower reduction reaction rooms. The lower reduction reaction rooms and the lower oxidation reaction rooms have reaction holes whose inner walls have carbon nanotubes and catalysts. A plurality of upper reduction reaction rooms delivers oxygen for the reduction reaction and drains the reduced water at the same time.

24 Claims, 10 Drawing Sheets

PASSIVE MICRO FUEL CELL

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an efficient and passive micro fuel cell, and more particularly, to a fuel cell fabricated by a MEMS (Micro-Electro-Mechanical System) method.

BACKGROUND OF THE INVENTION

Currently, various kinds of portable electrical apparatuses such as notebook computers, personal digital assistants (PDA) and mobile phones need a miniature power generator. Conventional rechargeable batteries are limited by their weight and charging convenience for use, and therefore several power generators have been developed to replace them. Among these power generators, fuel cells fabricated by the MEMS method have been well and rapidly developed because they have the advantages of fast response, high heat dissipation and miniaturized size.

Figure 1:
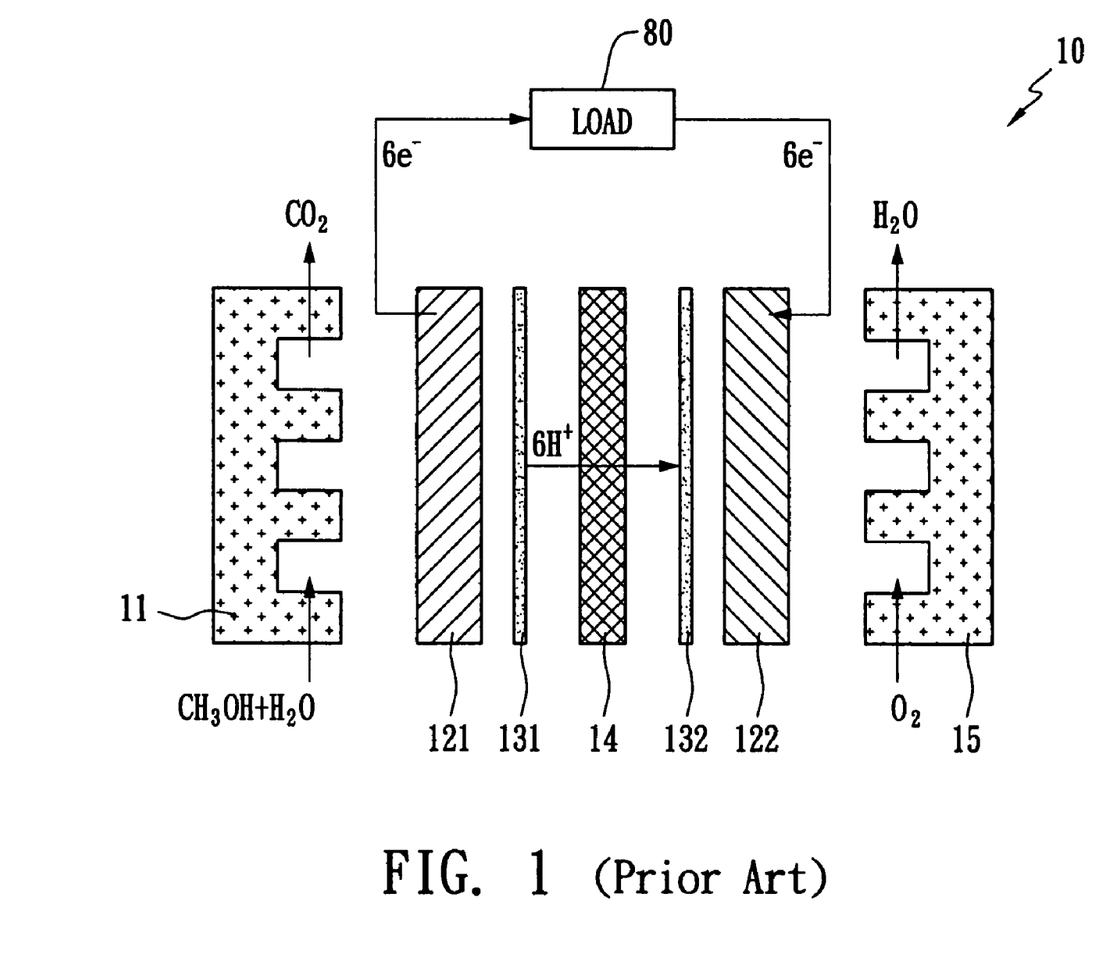
FIG. 1 is a schematic view showing the structure of a conventional direct methanol fuel cell.

Fuel cells utilize an electrochemical reaction to decompose a fuel into hydrogen ions and electrons together so that a current occurs. Hydrogen gas, methanol, natural gas or gasoline can be employed as the fuel. FIG. 1 is a schematic diagram showing the structure of a direct methanol fuel cell (DMFC) 10. Methanol dilute solution is fed into the channels of an anode 11, and diffuses into a porous gas diffusion layer (GDL) 121. When methanol reaches the catalyst layer 131, the following reaction occurs.

Oxidation Reaction :  $CH_3OH+H_2O \rightarrow CO_2+6H^++6e^-$

In this regard, six electrons collected at the gas diffusion layer 121 move along an external circuit to drive a load 80 and reach another gas diffusion layer 122 of the cathode 15. Simultaneously, carbon dioxide is produced after the oxidation reaction, and needs to be vented into the surroundings. A porous membrane 14 between the gas diffusion layers 121 and 122 separates the anode 11 from the cathode 15 and allows the protons to move across it to reach a catalyst layer 132 so that the following reduction reaction occurs therein.

Reduction Reaction :  $3/2O_2+6H^++6e^- \rightarrow 3H_2O$

Oxygen necessary for the reduction reaction is blown by an air blower into the gas diffusion layer 122 through the channels of the cathode 15, and meanwhile, water produced at the cathode 15 are blown off toward the external surroundings. The total reaction of the oxidation and the reduction action is illustrated with the following formula.

Total Reaction :  $CH_3OH+3/2O_2 \rightarrow CO_2+2H_2O$

However, a micro pump is necessary for the fuel cell 10 to feed the methanol solution and drain surplus liquid. In this regard, the micro pump needs to be supplied with power so that the performance of the fuel cell 10 is lowered. Moreover, a power-consumption blower is also necessary for the fuel cell 10 to vent the water produced after the reduction reaction because the oxygen cannot be fed into the fuel cell if the water exists in the channels of the cathode 15. The conventional fuel cell 10 has an unresolved problem in which the methanol passes through the porous membrane 14 by diffusion and reacts with the oxygen at the cathode 15. Therefore, the operation voltage of the fuel cell 10 is degraded.

In conclusion, a highly efficient fuel cell is in urgent demand for the portable apparatuses. Such a fuel cell can make the best use of a fuel and efficiently transform it into electrical power.

BRIEF SUMMARY OF THE INVENTION

The first objective of the present invention is to provide an efficient and passive micro fuel cell. The micro fuel cell can deliver a fuel and drain waste liquid by capillarity; hence, the consumption of the fuel is directly related to the generation of electricity.

The second objective of the present invention is to provide a micro fuel cell with a non-return pressure structure. The non-return pressure structure can prevent fuel delivery from a pressure blockage caused by the gas produced after the oxidation reaction.

The third objective of the present invention is to provide a micro fuel cell capable of separating gas from liquid. The gas and the liquid are separated from each other to be delivered by a surface with specific hydrophilic or hydrophobic treatment. Therefore, the fuel cell can stably generate power.

The fourth objective of the present invention is to provide a micro fuel cell capable of successfully moving protons produced in the oxidation reaction holes of an anode through a porous membrane layer to reach the reduction reaction holes of a cathode. Accordingly, the efficiency of the reduction reaction is heightened.

The fifth objective of the present invention is to provide a micro fuel cell capable of respectively drawing and draining different kinds of gas by capillarity. It utilizes hydrophilic or hydrophobic treated micro-channels with non-uniform cross-section to easily vent gas produced during an oxidation reaction and successfully draw gas from its external surroundings to feed in a reduction reaction.

In order to achieve these objectives, the present invention discloses an efficient and passive micro fuel cell comprising an anode plate, a reaction plate, a cathode plate and a condensation plate. The anode plate draws a dilute solution of methanol from a fuel tank to delivery micro-channels by capillarity, and the methanol is delivered to a plurality of upper oxidation reaction rooms through the delivery micro-channels. The upper oxidation reaction rooms vent carbon dioxide and vapor produced after an oxidation reaction to the condensation plate through lower oxidation reaction holes with non-uniform cross-section and a plurality of exhaust holes. Subsequently, the condensation plate separates the carbon dioxide and vapor from each other by means of condensation, surface tension gradient and capillarity so that the carbon dioxide can be vented into the atmosphere and the condensed water collected by a waste tank. Meanwhile, the methanol solution is delivered to a plurality of lower reaction rooms of the reaction plate. There is a plurality of carbon nanotubes and catalysts attached to the inner walls of reaction holes in the lower reaction rooms so as to accelerate the reaction. Protons produced after the oxidation reaction pass through the inner walls of the reaction holes and a porous membrane layer placed in the middle of the reaction plate, and reach lower reduction reaction rooms. Similarly, the lower reduction reaction rooms have reaction holes whose inner walls have carbon nanotubes and catalysts attached so that the oxygen is reduced into water. A plurality of upper reduction reaction rooms included in the cathode plate deliver oxygen to the lower reduction reaction rooms for reduction reaction and drain reduced water to water exhaust microchannels at the same time.

In the lower oxidation reaction rooms, the whole or the upper portion of the oxidation reaction hole is shaped into a hole with a non-uniform cross-section for draining carbon dioxide and vapor produced after the oxidation reaction. Subsequently, they are vented into the external surroundings through the upper oxidation reaction rooms. The surface area and reaction are increased by the plurality of carbon nanotubes and catalysts attached to the inner walls of oxidation reaction holes. Furthermore, there is a plurality of porous polymer materials surrounding the outer walls of the reaction holes to assist the protons in passing through the porous membrane layer of the reaction plate to reach the lower reduction rooms. In the lower reaction rooms, the whole or the upper portion of the reduction reaction hole is also shaped into a hole with a non-uniform cross-section. Such upper reaction rooms cooperating with the lower reduction reaction rooms deliver oxygen to the reduction reaction holes and drain reduced water to a reservoir. Similarly, there is a plurality of carbon nanotubes and catalysts attached to the inner walls of reduction reaction holes so that the oxygen is accelerated to reduce into water. A plurality of air inlets provided on the cathode plate allows external oxygen to enter the lower reduction reaction rooms, including a plurality of rectangular ribs parallel to each other. The more the surface of the rib is adjacent to the air inlets, the more it is hydrophobic. Therefore, the reduced water is not accumulated around the air inlets.

Furthermore, non-return pressure ribs are provided on the interfaces between the delivery micro-channels and the upper reaction rooms, and can prevent the delivery of the methanol solution from the pressure blockage caused by the gas produced after the oxidation reaction. The non-return pressure ribs are a plurality of rectangles arranged in a parallel manner. The rectangles ribs are staggered on the interfaces, or part of them can be combined with arrow-shaped or Y-shaped ribs to have a diffuser-nozzle effect.

BRIEF DESCRIPTION OF THE SEVERAL VIEWS OF THE DRAWINGS

The invention will be described by referring to the appended drawings.

DETAILED DESCRIPTION OF THE INVENTION

Figure 2:
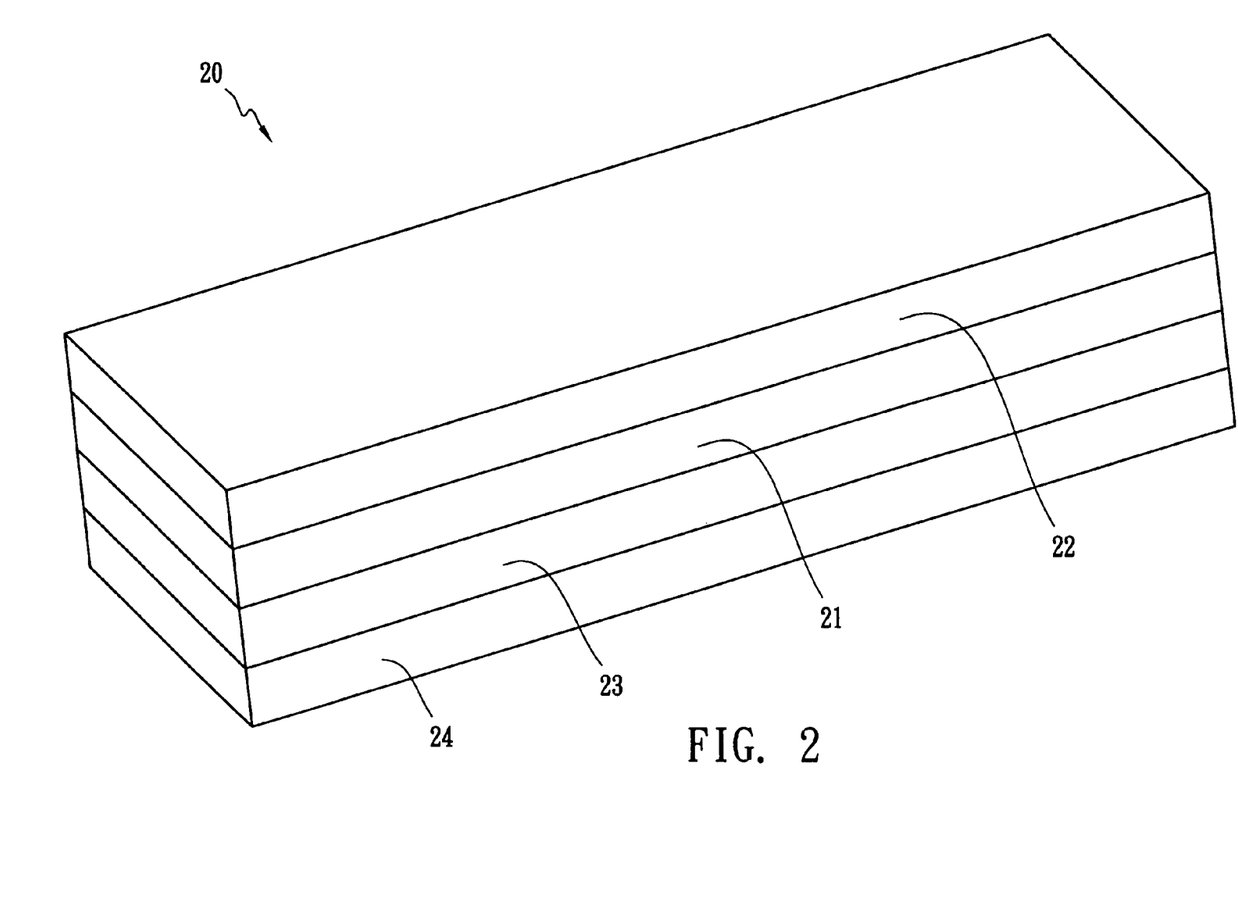
FIG. 2 is a perspective view of a passive micro fuel cell in accordance with the present invention.

FIG. 2 is a perspective diagram of a passive micro fuel cell in accordance with the present invention. The micro fuel cell 20 comprises an anode plate 21, a condensation plate 22, a reaction plate 23 and a cathode plate 24 all fabricated on silicon substrates, wherein the reaction plate 23 is interposed between the anode plate 21 and the cathode plate 24.

Figure 3:
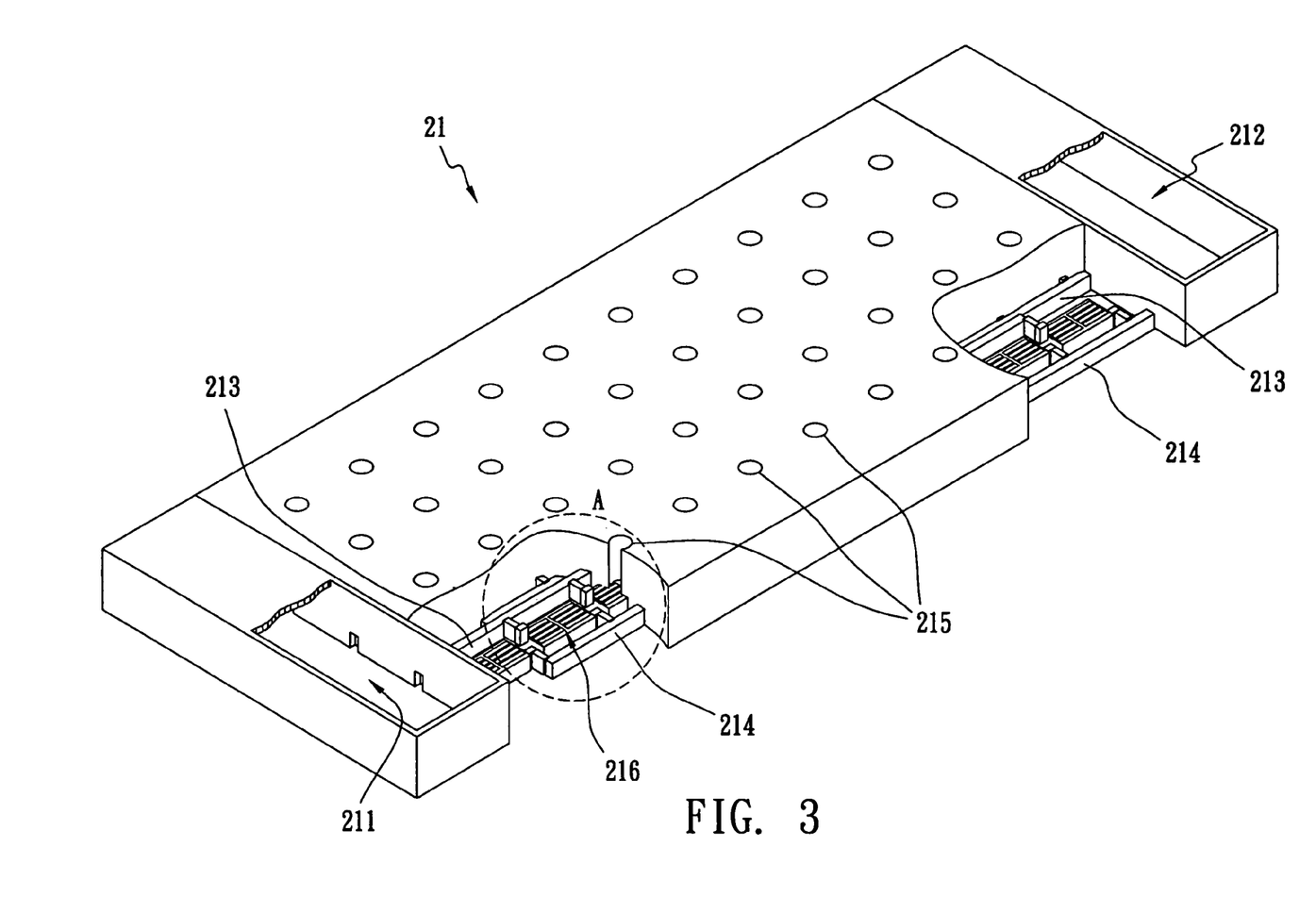
FIG. 3 is a perspective view of an anode plate in accordance with the present invention.
Figure 4:
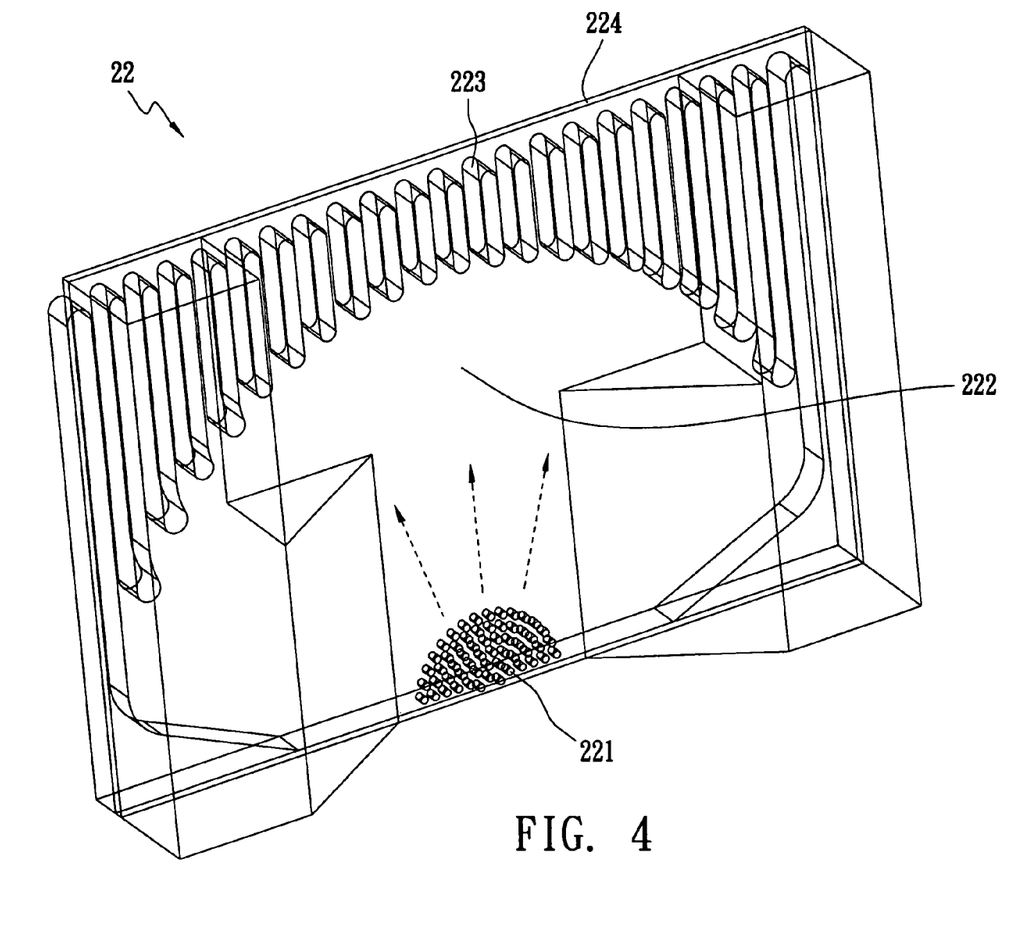
FIG. 4 is a perspective view of a vaporization plate in accordance with the present invention.

As shown in FIG. 3, a fuel tank 211 storing methanol dilute solution and a waste tank 212 collecting surplus methanol solution after an oxidation reaction are respectively placed either at two opposite sides or at the same side of the anode plate 21. A plurality of upper oxidation reaction rooms 216 is placed in the center of the anode plate 21 as an array arrangement. A delivery micro-channel 213 draws the methanol solution acting as a fuel from the fuel tank 211 and a waste liquid micro-channel 214 drains unreacted methanol solution to the waste tank 212. Both of the micro-channels 213 and 214 are separately formed on two sides of the upper oxidation reaction rooms 216. As shown in FIG. 4, the carbon dioxide and vapor produced after the oxidation reaction are vented from a plurality of exhaust holes 215 on the anode plate 21 to the stacked condensation plate 22. The carbon dioxide is vented into the surroundings through hydrophobic-treated exhaust holes 221 on the condensation plate 22. In addition, condensed droplets are driven to move along the arrow direction showing the increasing hydrophilic gradient of the surface in a semicircular zone 222. Subsequently, the droplets pass through hydrophilic-treated leading micro-channels 223 toward a porous liquid collection zone 224. Finally, the waste tank 212 collects the droplets.

Figure 5A:
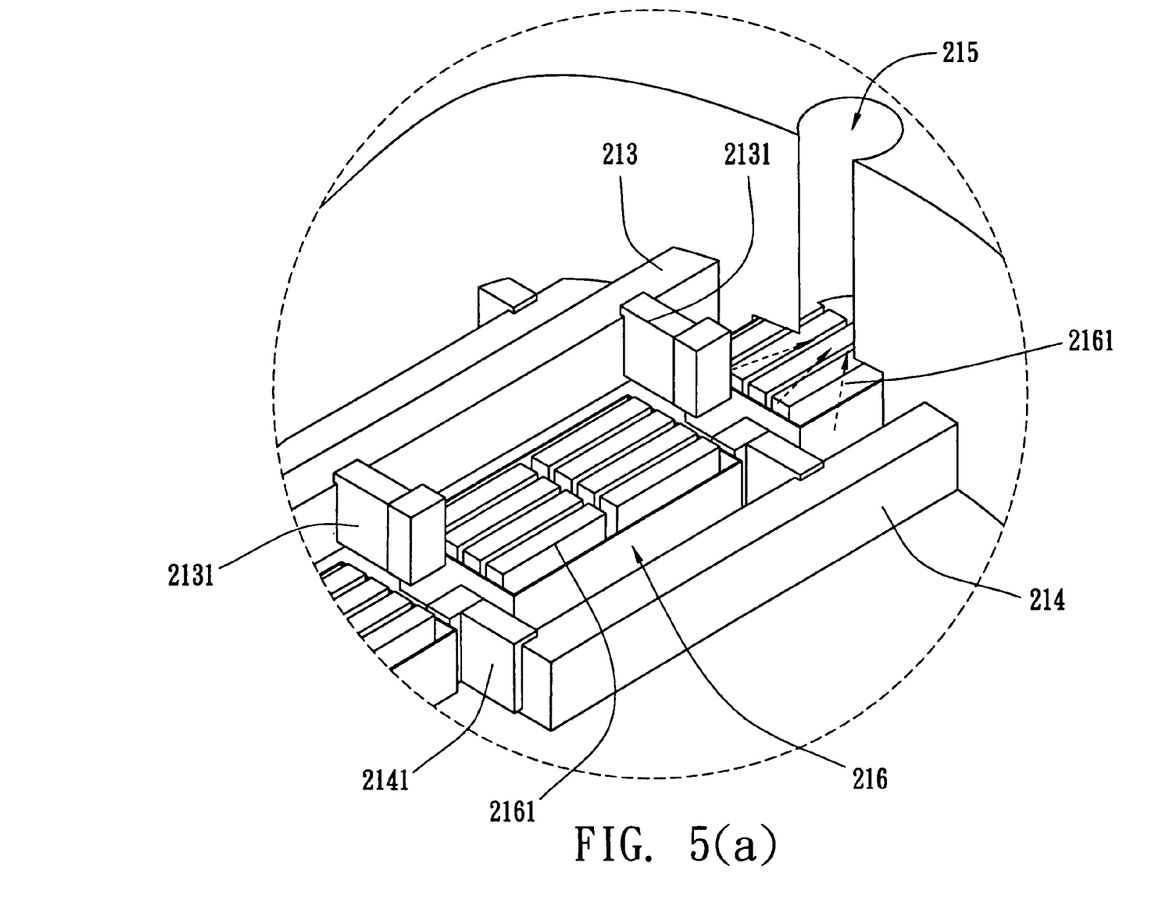
FIG. 5(a) is an enlarged perspective view of portion A as indicated in FIG. 3.

FIG. 5(a) is an enlarged diagram of the A portion in FIG. 3. The delivery micro-channel 213 and waste liquid micro-channel 214 are hollow pipes, and are connected to the upper oxidation reaction room 216 respectively through branch channels 2131 and 2141. The upper oxidation reaction room 216 includes a plurality of rectangular ribs 2161 parallel to each other and arranged as an array. The more the surface of the rib 2161 is adjacent to the exhaust hole 215, the more it is hydrophobic. That is, the hydrophobic gradient of the surface on the rib 2161 increases along the arrow direction in FIG. 5(a). Therefore, the waste liquid cannot stay in the exhaust hole 215. The inner surface of the channel enclosed by one of the lateral ribs 2161 and the upper oxidation reaction room 216 has the highest hydrophilicity so that the methanol solution can be quickly drawn through the channels. On the contrary, the channel between two adjacent ribs 2161 has less hydrophilicity. Also, the more the surface of the channel is adjacent to the exhaust hole 215, the more it is hydrophobic.

Figure 5B:
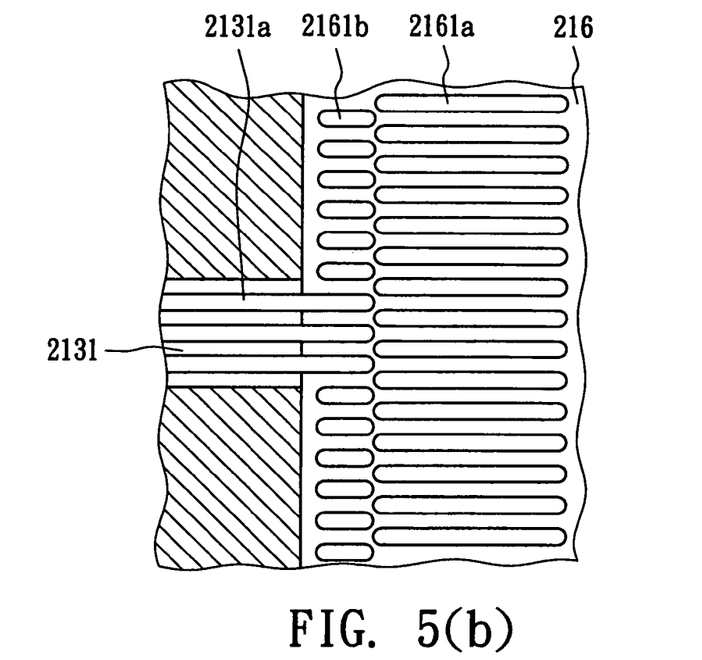
FIGS. 5(b)-5(c) are schematic views of a non-return pressure structure in accordance with the present invention.

Further referring to FIG. 5(b), ribs 2131a and 2161b are placed on the interface between the branch channel 2131 and the upper oxidation reaction room 216, and they are arranged in a staggered manner. Therefore, they can prevent the delivery of the methanol solution in the branch channel 2131 from the pressure blockage caused from the expansion of carbon dioxide and vapor produced after the oxidation reaction.

Figure 5C:
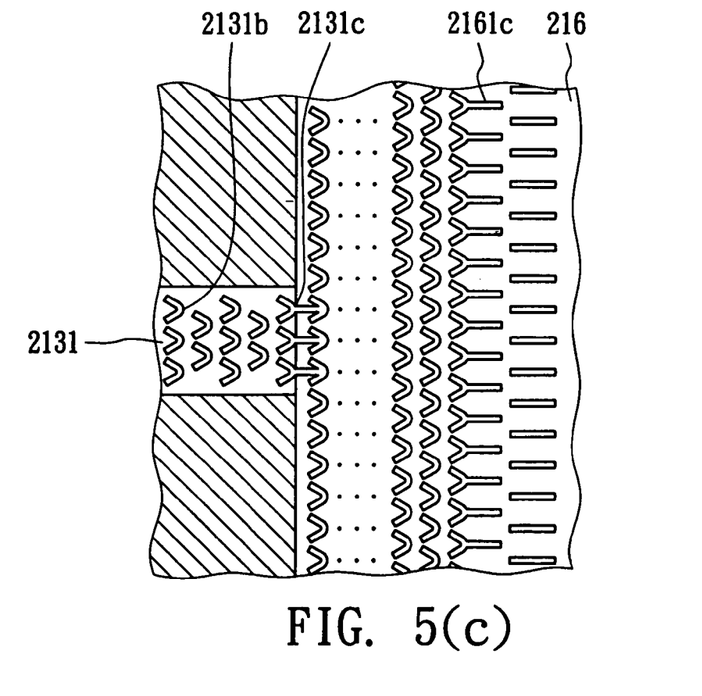

In addition to the aforesaid rectangular ribs as non-return pressure structures, FIG. 5(c) shows Y-shaped ribs 2161c. Furthermore, V-shaped ribs 2131b are placed on an area close to the inlet of the branch channel 2131. Simultaneously, arrow-shaped ribs 2131c lie across the boundary between the branch channel 2131 and the upper oxidation reaction room 216. The methanol solution successfully and broadly flows into the upper oxidation reaction room 216. The structure of the Y-shaped ribs 2161c acts as a diffuser nozzle so that the methanol solution is easily delivered into the upper oxidation reaction room 216 and the pressure of the produced gas is resisted.

Figure 6:
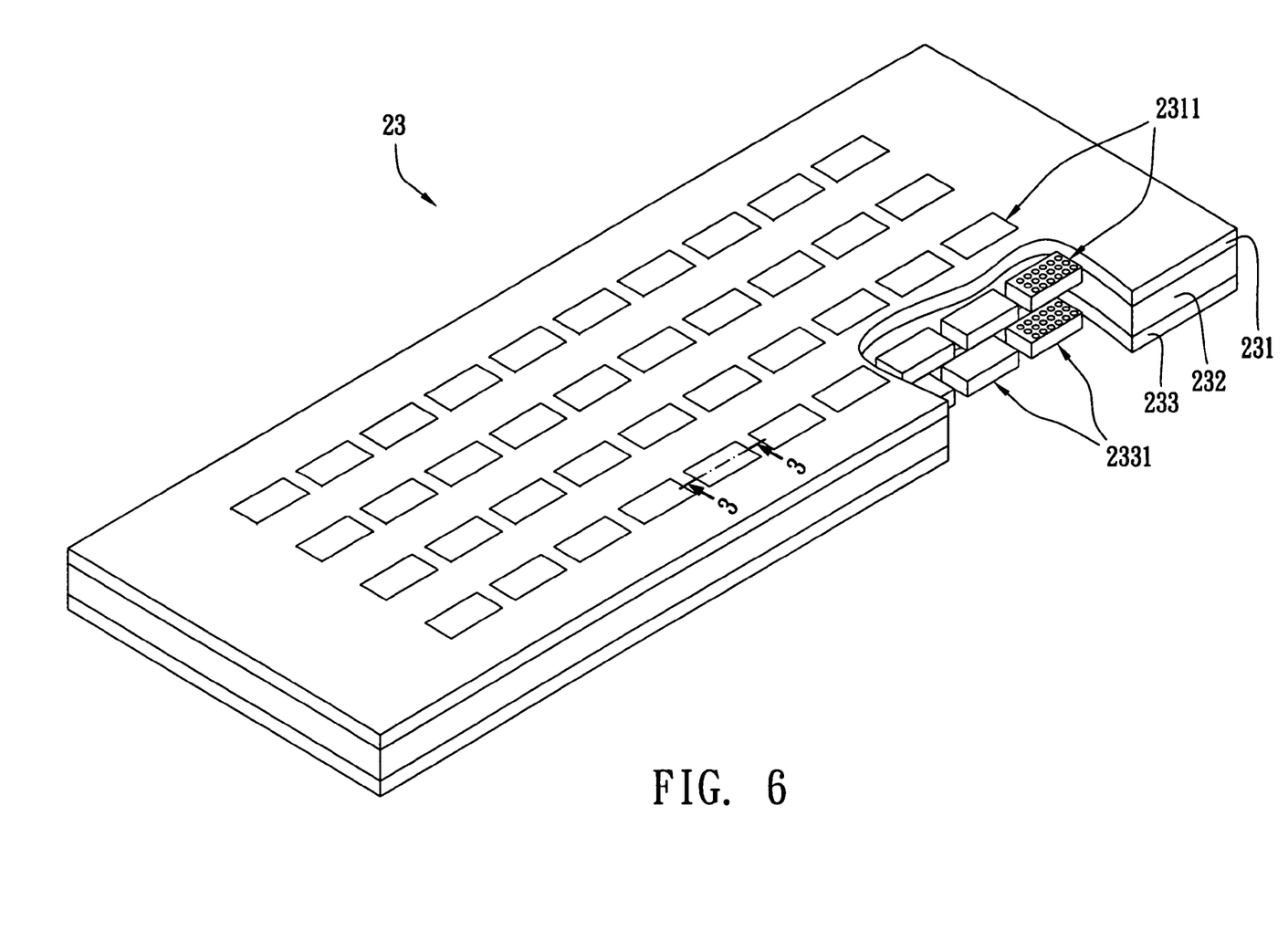
FIG. 6 is a perspective view of a reaction plate in accordance with the present invention.

FIG. 6 is a perspective diagram of a reaction plate. The reaction plate 23 includes an oxidation reaction layer 231 and a reduction reaction layer 233 sandwiched around a porous membrane layer 232. The oxidation reaction layer 231 has a plurality of lower oxidation reaction room 2311. Each of the lower oxidation reaction rooms 2311 is connected to an upper oxidation reaction room 216. Therefore, the methanol solution is delivered into the lower oxidation reaction rooms 2311 through the upper oxidation reaction room 216. Protons produced after the oxidation reaction move across the porous membrane layer 232 in the middle of the reaction plate 23, and reach lower reduction reaction rooms 2331 of the reduction reaction layer 233. The porous membrane layer 232 is a porous polymer film such as a fluoric polymer, Nafion, made by Dupont, and allows the protons to penetrate it.

Figure 7A:
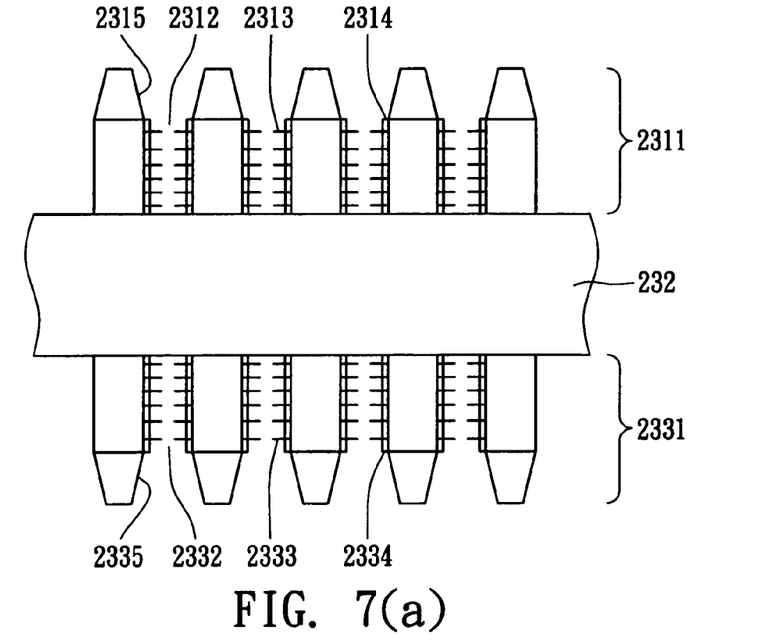
FIGS. 7(a)-7(b) are cross-sectional views along line 3-3 in FIG. 6 in accordance with the present invention.

FIG. 7(a) is a cross-sectional diagram along line 3-3 in FIG. 6. The whole or the upper portion of an oxidation reaction hole 2312 is shaped into a taper hole 2315 with a non-uniform cross-section so as to lead the methanol solution inside and vent the carbon dioxide and vapor produced after the oxidation reaction. There is a plurality of carbon nanotubes 2313 and conductive catalysts 2314 attached to the inner walls of the oxidation reaction hole 2312. The catalysts 2314 can provide the growth sites for the carbon nanotubes 2313 in the inner walls. Since plenty of the carbon nanotubes 2313 exist in the oxidation reaction hole 2312, the methanol solution can be mostly reacted therein and is not left. Consequently, much less methanol solution moves across the porous membrane layer 232 and avoids reacting with oxygen. Similarly, the whole or the inlet portion of the reduction reaction hole 2332 is also shaped into a taper hole 2335 with a non-uniform cross-section. Such lower reaction rooms 2331 cooperating with the upper reduction reaction rooms 243 deliver oxygen to the reduction reaction hole 2332 and drain away the reduced water. There is a plurality of carbon nanotubes 2333 and catalysts 2334 attached to the inner walls of the reduction reaction hole 2332.

Figure 7B:
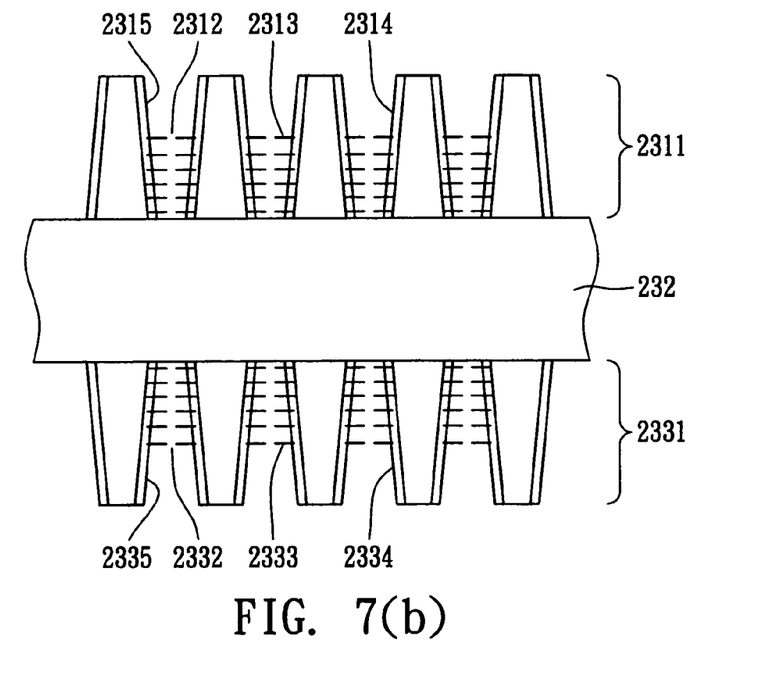
Figure 8A:
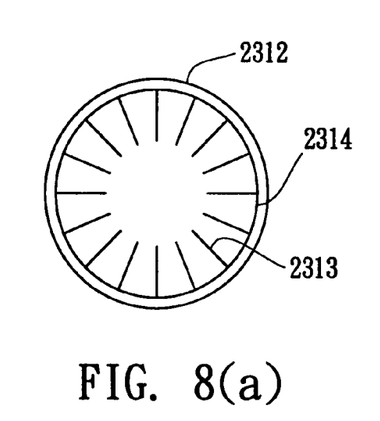
FIGS. 8(a)-8(d) are top plan views of the oxidation or reduction reaction holes in FIGS. 7(a)-7(b).
Figure 8B:
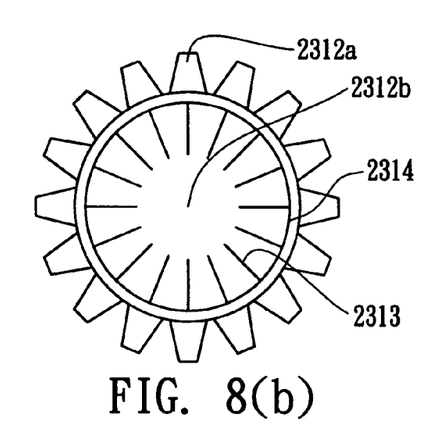
Figure 8C:
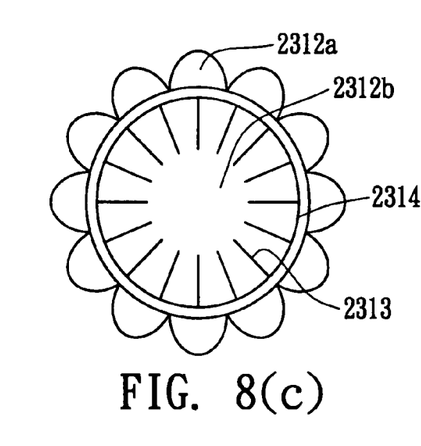
Figure 8D:
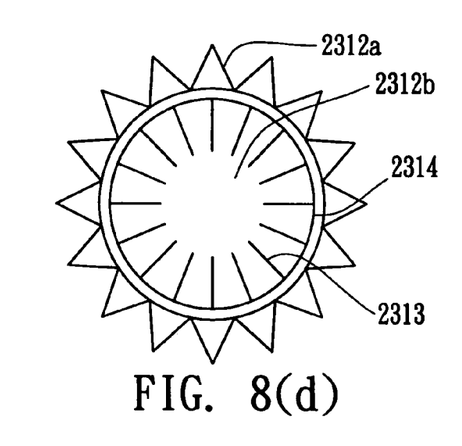

FIGS. 8(a)-8(d) are top views of the oxidation or reduction reaction holes 2312 and 2332 in FIGS. 7(a)-7(b). The curvature of an outer wall 2312a is larger than the curvature of an inner wall 2312b. A Nafion polymer material can be easily filled in the outer wall 2312a due to the existence of larger pressure differences therein by means of surface tension. The polymer material allows the protons to pass through it and penetrate the underlying porous membrane layer 232. The outer wall 2312a can also be designed into other different profiles as shown in FIGS. 8(b)-8(d) based on the fact that the curvature and area of the outer wall 2312a are both larger than those of the inner wall 2312b.

Figure 9:
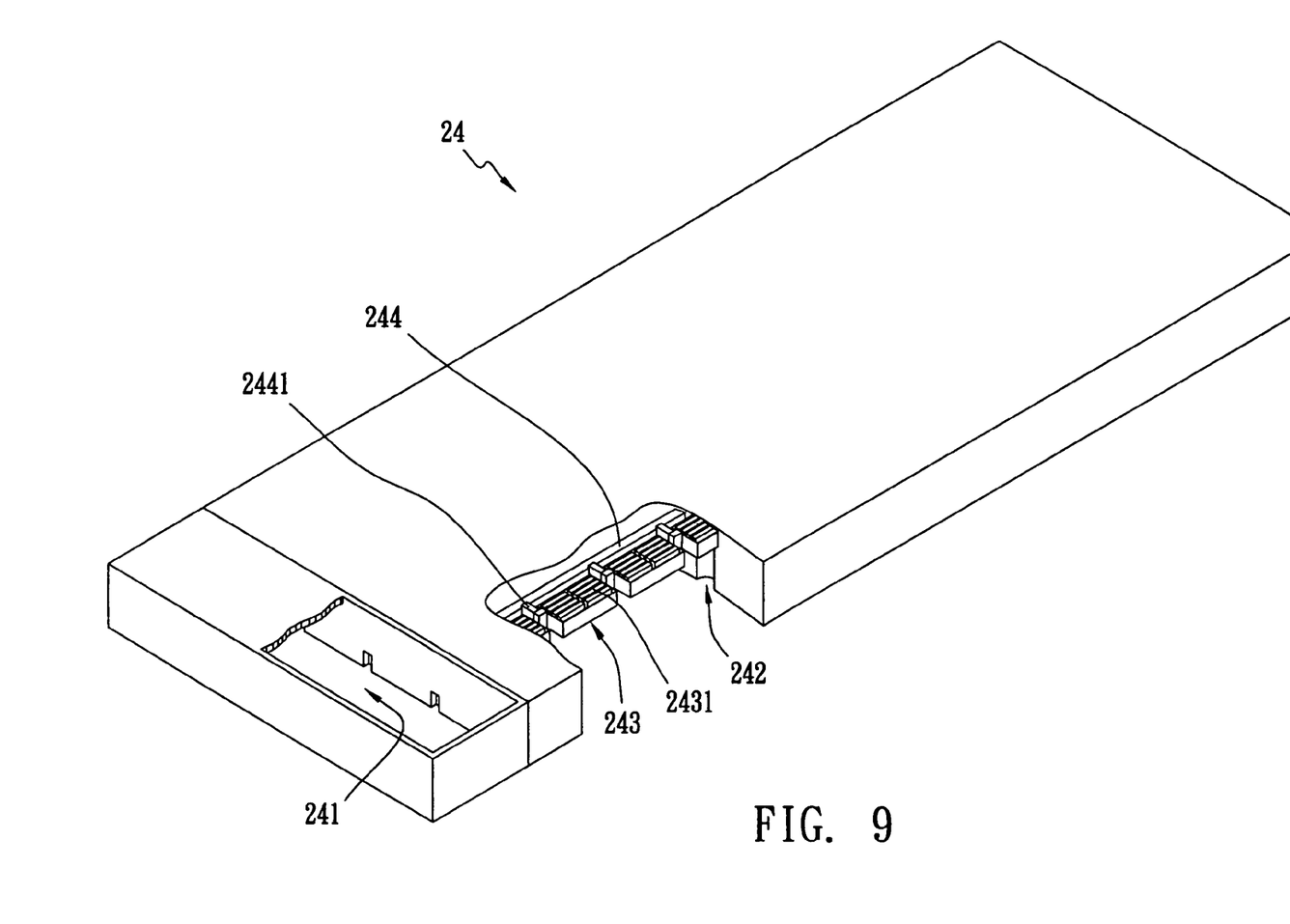
FIG. 9 is a perspective view of a cathode plate in accordance with the present invention.

FIG. 9 is a perspective diagram of a cathode plate 24. The cathode plate 24 and anode plate 21 have similar structures. Major differences between them are that the cathode plate 24 has no networks for fuel delivery, but it needs water exhaust micro-channels 244 to drain away the reduced water. In order to quickly drain the reduced water to a reservoir 241, hydrophilic treatment is conducted on the inner walls of the water exhaust micro-channels 244; hence, water molecules are dragged by surface tension to flow into the reservoir 241. Similarly, hydrophilic treatment is also conducted on the inner walls of the delivery micro-channel 213 and waste liquid micro-channel 214. Consequently, a passive delivery system with no power consumption is completed because liquids automatically flow along their predetermined directions. The water exhaust micro-channels 244 are connected to upper reduction reaction rooms 243 through a plurality of branch channels 2441. There is a plurality of rectangular ribs 2431 parallel to each other for leading the reduced water into the branch channel 2441. At least one air inlet 242 provided below the upper reduction reaction room 243 allows external oxygen to enter the upper reduction reaction room 243. The more the surface of the rib 2431 is adjacent to the air inlet 242, the more hydrophobic it is. Therefore, the reduced water is not accumulated around the air inlet 242, and is drained into the branch channel 2441 through the channels enclosed by the outside ribs 2431 and the upper reduction reaction room 243.

The above-described embodiments of the present invention are intended to be illustrative only. Numerous alternative embodiments may be devised by persons skilled in the art without departing from the scope of the following claims.

I claim:

1. A passive micro fuel cell comprising:
a fuel tank containing a methanol solution therein;
a waste tank;
an anode plate having a first surface and a second surface opposite said first surface, said anode plate horizontally disposed adjacent to said fuel tank, said anode plate horizontally disposed adjacent to said waste tank, said waste tank disposed opposite to said fuel tank, said anode plate having at least one delivery micro-channel and at least one upper oxidation reaction room and at least one exhaust hole and at least one waste liquid micro-channel, the delivery micro-channel connected to said fuel tank so as to draw said methanol solution from said fuel tank and connected to the upper oxidation reaction room through branch channels, said branch channels being aligned in parallel, the delivery micro-channel being perpendicular to said branch channels, the waste liquid micro-channel disposed lower than the delivery micro-channel and the branch channels, the delivery micro-channel being suitable for delivering said methanol solution in a liquid phase to the upper oxidation reaction room, the upper oxidation reaction room suitable for carrying out an oxidation reaction therein, the exhaust hole connected to the upper oxidation reaction room and reaching said second surface, the exhaust hole suitable for venting a gas produced after the oxidation reaction of the methanol solution, the delivery micro-channel having a longitudinal direction that is perpendicular to a longitudinal direction of the exhaust hole;
a reaction plate having a plurality of oxidation reaction holes and a plurality of reduction reaction holes and a porous membrane layer, said reaction plate being directly stacked on said second surface of said anode plate and on said fuel tank, said plurality of reduction reaction holes positioned opposite said plurality of oxidation reaction holes, said porous membrane layer interposed between said plurality of oxidation reaction holes and said plurality of reduction reaction holes, said plurality of oxidation reaction holes being adjacent said anode plate, said plurality of oxidation reaction holes having a plurality of carbon nanotubes and catalysts therein, said plurality of reduction reaction holes having a plurality of carbon nanotubes and catalysts therein; and
a cathode plate having at least one air inlet and at least one lower reaction room and at least one water exhaust micro-channel, the lower reaction room being adjacent to said plurality of reduction reaction holes and connected to the air inlet, the water exhaust micro-channel connected to the lower reaction room so as to drain water produced from a reduction reaction.

2. The passive micro fuel cell of claim 1, wherein said anode plate is further comprised of:
   at least one waste liquid micro-channel suitable for draining away unreacted methanol solution from the upper oxidation reaction room.

3. The passive micro fuel cell of claim 2, wherein said anode plate is further comprised of:
   a waste tank connected to the waste liquid micro-channel and suitable for collecting the unreacted methanol solution through the waste liquid micro-channel.

4. The passive micro fuel cell of claim 1, wherein the delivery micro-channel draws the methanol solution from said fuel tank by surface tension and such that the gas does not pass through the delivery micro-channel.

5. The passive micro fuel cell of claim 1, wherein the delivery micro-channel has an inner surface with a hydrophilic treatment.

6. The passive micro fuel cell of claim 1, wherein the upper oxidation reaction room comprises a plurality of ribs parallel to each other and channels enclosed by the ribs, the channels suitable for delivering the methanol solution to the oxidation reaction holes and for venting the reacted gas through the exhaust hole.

7. The passive micro fuel cell of claim 6, wherein the rib has a surface adjacent to the exhaust hole.

8. The passive micro fuel cell of claim 6, wherein channels have a surface between the ribs and a wall of the upper oxidation reaction room, the surface between the ribs and the wall of the upper oxidation room has a hydrophilicity that is higher than a hydrophilicity of surfaces inside the channels between two of the ribs.

9. The passive micro fuel cell of claim 1, said plurality of oxidation reaction holes forming at least one lower oxidation reaction room, the carbon nanotubes of said plurality of oxidation reaction holes being attached to inner walls of said plurality of oxidation reaction holes so as to increase a reaction area of the oxidation reaction in the methanol solution.

10. The passive micro fuel cell of claim 1, wherein said plurality of reduction reaction holes form at least one lower reduction reaction room so as to utilize the carbon nanotubes and catalysts attached to inner walls of said plurality of reduction reaction holes so as to enable oxygen to be reduced into water after the reduction reaction.

11. The passive micro fuel cell of claim 1, wherein a catalyst layer is overlaid on inner walls of said plurality of oxidation reaction holes and said plurality of reduction reaction holes so as to provide growth sites for the carbon nanotubes.

12. The passive micro fuel cell of claim 1, wherein said porous membrane layer is comprised of a fluoric polymer.

13. The passive micro fuel cell of claim 1, wherein said cathode plate further comprises a reservoir suitable for collecting reduced water through the water exhaust micro-channel.

14. The passive micro fuel cell of claim 1, wherein the water exhaust micro-channel has a hydrophilic treatment so as to cause surface tension to drain away the water.

15. The passive micro fuel cell of claim 1, wherein the upper reduction reaction room comprises a plurality of ribs parallel to each other and channels enclosed by the ribs, the channels suitable for delivering the water to the water exhaust micro-channel and for feeding the oxygen to said plurality of reduction reaction holes.

16. The passive micro fuel cell of claim 15, wherein a surface of a one of said plurality of ribs is adjacent to the air inlet.

17. The passive micro fuel cell of claim 1, further comprising:
   a plurality of non-return pressure ribs provided on an interface between the delivery micro-channel and the upper reaction room, said plurality of non-return pressure ribs suitable for preventing the methanol solution from being blocked by a pressure of a reacted gas produced after the oxidation reaction.

18. The passive micro fuel cell of claim 17, wherein said plurality of non-return pressure ribs are in an array of a plurality of rectangles arranged in parallel.

19. The passive micro fuel cell of claim 17, wherein said plurality of non-return pressure ribs are comprised of arrow-shaped ribs or Y-shaped ribs erected on said interface.

20. The passive micro fuel cell of claim 17, wherein said plurality of non-return pressure ribs form a diffuser nozzle.

21. The passive micro fuel cell of claim 1, further comprising:
   a condensation plate placed on said anode plate and opposite said reaction plate, said condensation plate comprising:
      at least one exhaust hole suitable for venting a mixture of vapor and gas after the oxidation reaction;
      at least one semicircular zone connected to the exhaust hole, the semicircular zone suitable for separating liquid and gas from each other to deliver them respectively;
      at least one leading micro-channel suitable for drawing a liquid droplet from the semicircular zone; and
      at least one porous liquid collection zone suitable for collecting the liquid.

22. The passive micro fuel cell of claim 1, wherein said plurality of oxidation reaction holes and said plurality of reduction reaction holes are holes with a non-uniform cross-section.

23. The passive micro fuel cell of claim 1, further comprising:
   a porous polymer material filled in said plurality of oxidation reaction holes and said plurality of reduction reaction holes.

24. A passive micro fuel cell comprising:
   a fuel tank containing a methanol solution;
   a waste tank;
   an anode plate having a first surface and a second surface opposite said first surface, said anode plate horizontally disposed adjacent to said fuel tank, said anode plate horizontally disposed adjacent to said waste tank, said waste tank disposed opposite to said fuel tank, said anode plate having at least one delivery micro-channel and at least one upper oxidation reaction room and at least one exhaust hole and at least one waste liquid micro-channel, the delivery micro-channel connected to said fuel tank so as to draw the methanol solution from said fuel tank, the delivery micro-channel connected to the upper oxidation reaction room through branch channels, said branch channels being aligned in parallel, the delivery micro-channel being perpendicular to said branch channels, the waste liquid micro-channel disposed lower than the delivery micro-channel and the branch channels, the delivery micro-channel being suitable for delivering the methanol solution in a liquid phase to the upper oxidation reaction room, the upper oxidation reaction room suitable for carrying out an oxidation reaction therein, a plurality of non-return pressure ribs being disposed on an interface between the delivery micro-channel and the upper oxidation reaction room, said plurality of non-return pressure ribs suitable for preventing the delivery of the methanol solution from being blocked by a pressure of a reacted gas produced after the oxidation reaction, the waste liquid micro-channel suitable for draining-unreacted methanol solution away from said upper oxidation reaction room after the oxidation reaction, said delivery micro-channel being disposed above the waste liquid micro-channel, the exhaust hole connected to the upper oxidation reaction room and reaching said second surface, the exhaust hole suitable for venting a gas produced after the oxidation reaction of the methanol solution, the delivery micro-channel having a longitudinal direction that is perpendicular to a longitudinal direction of the exhaust hole, said exhaust hole penetrating through the first surface and the second surface;

a reaction plate having a plurality of oxidation reaction holes and a plurality of reduction reaction holes and a porous membrane layer, said reaction plate being directly stacked on said second surface of said anode plate and on said fuel tank, said plurality of reduction reaction holes positioned opposite said plurality of oxidation reaction holes, said porous membrane layer interposed between said plurality of oxidation reaction holes and said plurality of reduction reaction holes, said plurality of oxidation reaction holes being adjacent said anode plate, said plurality of oxidation reaction holes having a plurality of carbon nanotubes and catalysts therein, said plurality of reduction reaction holes having a plurality of carbon nanotubes and catalysts therein;

a cathode plate having at least one air inlet and at least one lower reaction room;

at least one water exhaust micro-channel, which is hydrophilic so as to cause surface tension so as to drain away the water, the lower reaction room being adjacent to said plurality of reduction reaction holes and connected to the air inlet, the water exhaust micro-channel connected to the lower reaction room so as to drain water produced from a reduction reaction; and a condensation plate positioned on said anode plate opposite to said reaction plate, said condensation plate comprising:
  at least one exhaust hole, suitable for venting a mixture of vapor and gas after the oxidation reaction;
  at least one semicircular zone, having a hydrophilic gradient surface for condensing and delivering liquid, wherein the exhaust hole penetrates the semicircular zone and configures for venting gas;
  at least one leading micro-channel suitable for drawing a liquid droplet from the semicircular zone; and
  at least one porous liquid collecting zone suitable for collecting the liquid.

\* \* \* \* \*